United States Patent

[11] 3,631,717

| [72] | Inventors | Mahiko Kato<br>Tokyo;<br>Isamu Saito; Kensuke Aizawa, both of<br>Yokohama, all of Japan |
|------|-----------|--------|
| [21] | Appl. No. | 14,540 |
| [22] | Filed | Feb. 26, 1970 |
| [45] | Patented | Jan. 4, 1972 |
| [73] | Assignee | Tokico Ltd.<br>Kawasaki, Kanagawa-ken, Japan |
| [32] | Priorities | Feb. 26, 1969 |
| [33] | | Japan |
| [31] | | 44/14520;<br>Apr. 19, 1969, Japan, No. 44/30477 |

[54] CALORIE MEASURING DEVICE
4 Claims, 5 Drawing Figs.

| [52] | U.S. Cl. | 73/193 R |
|------|----------|----------|
| [51] | Int. Cl. | G01k 17/06 |
| [50] | Field of Search | 73/193, 340, 357 |

[56] References Cited
UNITED STATES PATENTS

| 3,012,435 | 12/1961 | Brising | 73/193 |
| 2,268,469 | 12/1941 | Barnhart | 73/340 |
| 2,474,369 | 6/1949 | Ray | 73/340 |
| 2,093,151 | 9/1937 | MacLean | 73/233 |

FOREIGN PATENTS

| 624,664 | 6/1949 | Great Britain | 73/193 |

*Primary Examiner*—Richard C. Queisser
*Assistant Examiner*—Herbert Goldstein
*Attorney*—Waters, Roditi, Schwartz & Nissen

ABSTRACT: A calorie-measuring device comprising a flowmeter arranged in a pipeline through which a heat carrier flows to a load wherein heat is emitted or absorbed, the flowmeter measuring the flow quantities of the heat carrier. A device is disposed in the pipeline for detecting the temperature in the pipeline before and after the load and it provides a signal indicative of temperature difference. A further device serves for multiplying the values of flow quantity and temperature difference to indicate the caloric value of heat emitted or absorbed in the load.

CALORIE MEASURING DEVICE

This invention relates to a calorie-measuring device and more particularly to a device for measuring heat quantities in calories consumed in a heating or cooling system utilizing a heat carrier such as water.

Recently, there has been increased use of a central air-conditioning system for supplying a heat carrier from a heat-supply source in one place to a multiple number of rooms, apartments or buildings and controlling the flow of heat. Under the circumstances there is necessity to measure the heat quantities consumed in each building. Especially in apartments having central heating or cooling apparatus it is desired to meter the consumed quantities of heat in respective rooms or floors. By measuring the heat quantities as desired under such circumstance it is now possible to calculate the cost for air-conditioning assigned for each building or room on the basis of actual heat consumption whereby the drawback of unreasonable expense alloted for each consumer irrespective of real consumption of heat but according to the floor area can be eliminated.

A primary object of the present invention is therefore to provide a device for measuring accurately the consumed heat quantities in an air-conditioning system for each section such as a room or building.

Another object of the invention is to provide a calorie-measuring device such as a calorimeter for measuring the quantity of emitted or absorbed heat of a supplied heat carrier at desired places of air-conditioning.

Another object of the invention is to provide a calorie-measuring device having a novel temperature difference-displacement conversion mechanism which can obtain a large amount of displacement as desired.

A further object of the invention is to provide a calorie-measuring device having a temperature difference-displacement conversion mechanism which can readily make correction of a conversion characteristic.

A still further object of the invention is to provide a calorie-measuring device having a novel arithmetic mechanism of a very simple construction which can multiply the flow quantity and the temperature difference of a heat carrier by stepless speed changing.

These and other objects and features of the invention will be more clearly apparent from the following description when read in conjunction with the accompanying drawings, in which.

Figure 1:
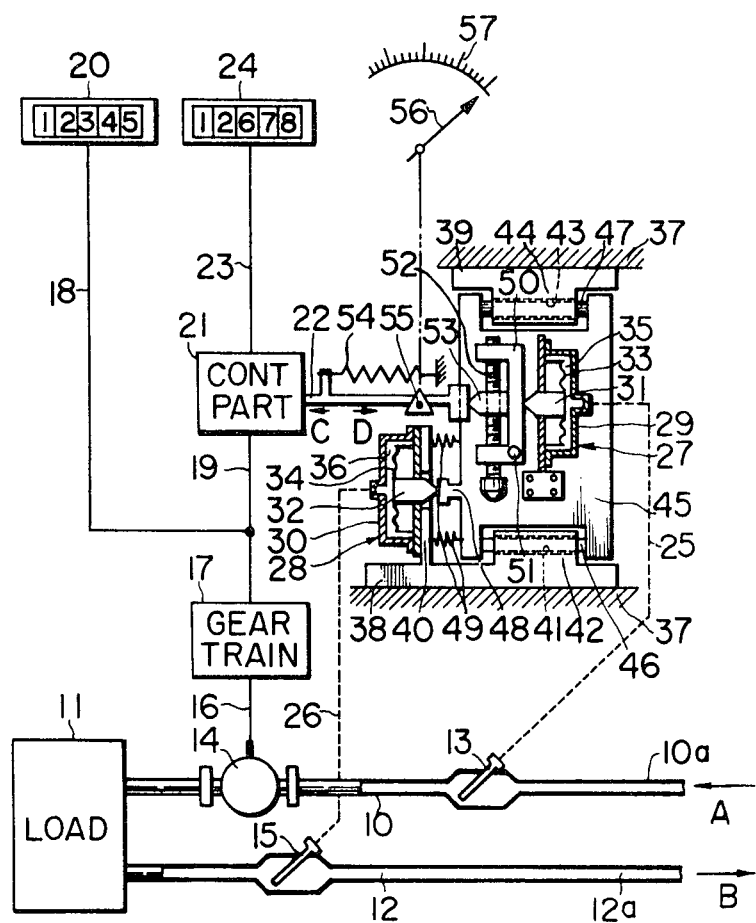
FIG. 1 is a diagrammatic view illustrating an embodiment of a device according to the present invention, showing a temperature difference-displacement conversion mechanism.

Referring now to FIG. 1, an embodiment of the device of the present invention will be illustrated. In the embodiment a calorie-measuring device in an air heating system is described. A heat carrier such as heated water from a heat carrier supply source (not shown) is supplied to an inlet side 10a of a feed pipeline 10 in the direction of arrow A. Passing through said pipeline 10 the heat carrier is then fed to a load 11 such as a heat exchanger or the like provided in a room or a building for emitting the heat for heating. After emission of heat the carrier is returned to the heat carrier supply source through a return pipeline 12 in the direction as shown by arrow B at the outlet side 12a. In the heat carrier supply source the returned heat carrier is heated again to be delivered to the feed pipeline 10. In the described embodiment there is solely shown a heating system consisting of the pipelines 10, 12 and the load 11, but one heat carrier supply source has a plurality of heating systems which are supplied with the heat carrier simultaneously from the supply source.

The heated water passing through the temperature of the feed pipeline 10 is detected by a temperature detection part 13 and its flow quantity is measured by a flowmeter 14 such as a volumetric flowmeter, a turbine type flow meter or the like. According to this embodiment, the temperature of the heated water flowing through the temperature detection part 13 is normally set at approximately 180° C. The temperature of the heated water passing through the return pipeline 12 is detected by a temperature detection part 15. As the water passing through the pipeline 12 has emitted of heat at the load 11, its temperature is lower than the temperature of the heated water passing through the pipeline 10, for instance, approximately 80° C. For the temperature detection parts 13 and 15 there may be used for example an expansible-type thermostat temperature sensing cylinder which converts a temperature variation into a linear volumetric variation. The described embodiment employs mercury as sealed fluid. Ethyl ether as the fluid may specifically be used for the objective of the air cooling.

Now rotation of an output rotary shaft 16 of the flowmeter 14 is transmitted to rotary shafts 18 and 19 through a rotary transmission gear train 17 provided for speed reduction and correction. For integratedly indicating the flow quantity of the heated water as measured by the flowmeter 14 there is provided a flow quantity integrating counter 20 which is driven through the shaft 18. The rotation of the rotary shaft 19 is supplied to a rotation control part 21 comprising an arithmetic mechanism described hereinafter, wherein the rotation of the rotary shaft 19 is controlled by a lever 22 of the temperature difference detection mechanism later described. In the control part 21, an arithmetic factor of flow quantity from the rotary shaft 19 and an arithmetic factor of temperature difference from the lever 22 are multiplied. The result of the multiplication is then transmitted to a calorie integrating counter 24 through a rotary shaft 23. As the product of volume of fluid and temperature is proportional to calories of heat, the heat quantities emitted and consumed at the load 11 can be indicated on the counter 24 in the unit of calorie.

The temperature difference-displacement conversion mechanism is now described. There are provided stressed flexible diaphragms 33 and 34 having displacement members 31 and 32 in bodies 29 and 30 of temperature sensing operation parts 27 and 28. There are chambers 35 and 36 which are defined by the diaphragms 33 and 34 in the bodies 29 and 30. The chambers 35 and 36 are communicated with narrow pipes 25 and 26 connected to the temperature detection parts 13 and 15 which are filled with a sealed liquid, as well as the narrow pipes 25 and 26 and the chambers 35 and 36.

Support members 38 and 39 are fixedly mounted on a frame body 37. The support member 38 has a base plate 40 having a temperature sensing operation part 28 fixed thereon and a hole through which a displacement member 32 is passed, and a bearing 42 having a hole 41. The support member 39 has a bearing 44 provided with a hole 43.

A movable plate 45 of generally H-shape has guide bars 46 and 47 slidably fitted in the holes 41 and 43 of the bearings 42 and 44 respectively provided between the lower ends and between the upper ends of the plate 45. A projection 48 is provided to contact the tip end of the displacement member 32 of the temperature sensing operation part 28. Between the base plate 40 of the support member 38 and the movable plate 45 are springs 49 urged leftward in the figure so that the projection 48 will always contact the member 32.

The temperature sensing operation part 27 is secured in a predetermined position on a movable plate 45. An adjuster 50 is pivotally mounted on the movable plate 45 by a pin 51 and contacts the displacement member 31. The adjuster 50 is provided with an adjustable screw 52 to which is threaded a displacement adjusting member 53. By turning around the screw 52, the adjusting member 53 is displaced in the axial direction relative to the screw.

The displacement lever 22 is biased to the right or in the direction of arrow D by a spring 54 tensioned between lever 22 and the frame body, one end of the lever 22 being always in contact with the adjusting member 53 and the other end cooperating with the control part 21. The displacement of the lever 22 is converted into a rotary movement through a fulcrum 55 on the lever 22 and the amount of displacement of the lever 22 is transmitted to a temperature difference indication pointer 56 in the form of a rotation. Thus, the pointer 56 and a dial 57 serve for the indication of temperature difference.

Figure 2:
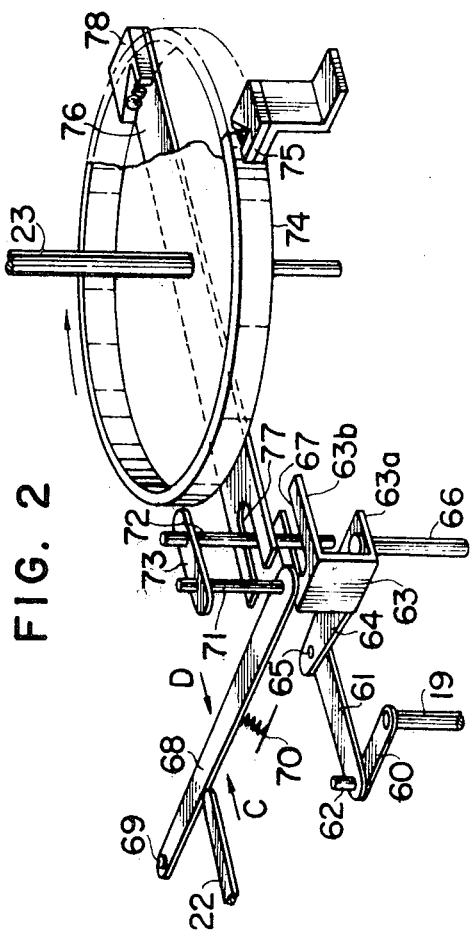
FIG. 2 is a perspective view of an embodiment of a control part comprising an arithmetic mechanism of the device.

Now the construction of the arithmetic mechanism in an embodiment of the described control part 21 is shown in FIG. 2. Therein one end of an arm 60 is secured to the rotary shaft 19 rotatable at a speed corresponding to the flow quantity as measured by the flowmeter 14 and the other end is provided with a connecting rod 61 rotatably movable about a shaft 62. A crank arm 64 having at one end a forked portion 63 has the other end pivotally connected with the other end of the rod 61 by a shaft 65. The arm 60, the rod 61 and the arm 64 constitute a crank mechanism. By rotation of the rotary shaft 19, the crank arm 64 swings about the crank shaft 66 on which one leg 63a of the forked portion 63 is pivotally mounted. There is provided a cut groove 67 on the other leg 63b of the forked portion 63.

The displacement lever 68 has an end to swing about a shaft 69 on the frame to move with the displacement of the lever 22 contacting a side of the lever 68, which in turn is urged to contact the lever 22 by a spring 70. At the rotatable free end of the lever 68 upstands a pin 71. Another pin 72 is provided in parallel with the pin 71 through a connecting arm 73 connected movably to the pin 71, the lower portion of the pin 72 slidably fitting in a groove 67 in the forked leg 63b.

A swingable arm 76 on the rotary shaft 23 which rotates integrally with a wheel 74 has a groove 77 at an end through which the pin 72 is slidably fitted and at the other end a unidirectional clutch 78 in contact with the outer periphery of the wheel 74. Also secured to the frame is another unidirectional clutch 75 being directed same as the clutch 78 and contacting the outer peripheral surface of the wheel 74. The clutches 75 and 78 are of the known free wheel construction having rotatable feed rollers carried by springs in respective notches, which enable the wheel 74 to rotate in the clockwise direction in the figure and restrain the rotation in the counterclockwise direction.

Now assuming that the flow quantity of the heated water respectively passing through the pipelines 10 and 12 are equivalent and the heat loss between the temperature detection parts 13 and 15 and the load 11 should be neglected, the quantity of heat emitted at the load 11 is proportional to the product of flow quantity of the heated water and the temperature difference before and after the load 11.

The operation of the device having the construction as hereinabove described is now illustrated.

When the heat of the heated water flowing the pipeline 10 is not emitted nor consumed at the load 11 in any amount but returned through the pipeline 12 at the same temperature, the temperatures detected from the temperature detection parts 13 and 15 respectively will be equal consequently the lever 22 is in the neutral position and accordingly the lever 68 is in the same, while the pin 72 is on the same axis as the shaft 66 as shown in FIG. 2. Even through the rotary shaft 19 is rotated by the output rotation of the flowmeter 14 whereby the arm 64 swings, merely the forked leg 63 b swings about the pin 72 which per se will not swing nor will the arm 76 so that the wheel 74 will not rotate nor will the calorie counter 24 be actuated. When the heated water does not flow through the load 11 the flowmeter 14 will not be actuated nor will the shaft 19 rotate so that the arm 64 will not swing. Since the wheel 74 does not rotate, the counter 24 will not be actuated.

An instance where a certain heat quantity is emitted and consumed at the load 11 will be described. At this instant, the temperature $T_2$ of the heated water flowing through the pipeline 12 corresponding to the heat quantity emitted at the load 11 will become lower than the temperature $T_1$ of the heated water flowing through the pipeline 10. As the heated water flows through the load 11, the flow quantity can be measured by the flowmeter 14. The measured flow quantity is carried on one hand through the rotary shaft 18 to the flow quantity integrating counter 20 so as to be integratedly displayed on the counter, and on the other hand through the rotary shaft 19 to the control part 21 in the form of an arithmetic factor.

As the temperature $T_2$ of the heated water passing through the temperature detection part 15 is lowered the liquid sealed in the detection part 15 contracts in volume. The variation in the volume of the sealed liquid is transmitted to the chamber 36 of the temperature sensing operation part 28 through pipe 26, thereby the diaphragm 34 and the displacement member 32 shift to the left as in FIG. 1. According to the leftward shifting of the member 32, the movable plate 45 urged to contact the member 32 through the projection 48 by the spring 49 slides to the left. By leftward sliding of the movable plate 45 the lever 22 is displaced in the direction of the arrow C.

The temperature of the heated water flowing through the pipeline 10 is ordinarily controlled so as to be substantially constant. However, if the temperature $T_1$ of the heated water in the pipeline 10 rises the sealed liquid in the temperature detection part 13 will expand and the diaphragm 33 and the displacement member 31 of the temperature sensing operation part 27 shift to the left in the figure. By leftward shifting of the member 31, the adjuster 50 will be pushed and slightly moved in the counterclockwise direction. The lever 22 being pushed forward by the adjusting member 53 is consequently displaced in the direction of arrow C in the similar manner as described above. Therefore, the lever 22, though the temperatures $T_1$ and $T_2$ under the condition of $T_1 > T_2$ vary, is displaced in the direction of the arrow C as compared with the condition of $T_1 = T_2$ having an amount of displacement which corresponds to the relative temperature difference $T_1 - T_2$.

Hence, it will be noted that the lever 22 would always displace in an amount corresponding to the difference of temperatures $T_1$ and $T_2$ detected by the temperature detection parts 13 and 15. In the control part 21 is introduced the temperature difference as another arithmetic factor by the lever 22. Simultaneously, by the displacement of the lever 22 the pointer 56 is rotated through the fulcrum 55 so that the pointer 56 will provide indication of temperature difference on the dial 57.

In order to prevent the displacement of the lever 22 when the members 31 and 32 displace in the same amount, it may preferably be arranged that the position of the adjusting member 53 will previously be adjusted with the screw 52 and the temperature difference-displacement conversion characteristic be well corrected.

In the control part 21 the arithmetical operation to obtain the flow quantity induced by the rotary shaft 19 as hereinabove described and the temperature difference introduced by the lever 22 is now described with reference to FIG. 2.

As the rotary shaft 19 rotates at a speed proportional to the flow quantity as measured by the flowmeter 14, the crank arm 64 swings about the shaft 66 as does the forked leg 63b. The lever 22 has been displaced in the direction of the arrow C in response to the temperature difference which was detected as described above, thereby the lever 68 is in a displaced position by rotation in the direction of the arrow C. By the described rotary displacement of lever 68, the pin 72 shifts to the right in the figure away from the axis of the shaft 66 so that it is placed in a position displaced to an open side at the forward end in the groove 67 of the leg 63b i.e., to the bottom side of the cut groove 77 or closer to the shaft 23.

Accordingly, the swinging movement of the leg 63b is transmitted to the arm 76 through the pin 72 thereby the arm 76 is swung about the shaft 23. As the arm 76 has at its end the unidirectional clutch 78 contacting the wheel 74, during the reciprocal swing movement of the arm 76, the clutch 78 in its clockwise rotation engages frictionally with the outer peripheral surface of the wheel 74, which in turn rotates in the clockwise direction. During the rotation of the arm 76 in the counterclockwise direction, the clutch 78 slides over the outer peripheral surface of the wheel 74 which, being restrained of its counterclockwise rotation by the unidirectional clutch 75, will not rotate in the counterclockwise direction.

According to the swing movement of the arm 76, the wheel 74 rotates intermittently, the rotation of which is transmitted to the counter 24 through the rotary shaft 23 and produces in the counter 24 an indication of the calories emitted in the load 11.

It is seen that the rotary shaft 19 rotates more rapidly for increase of the flow quantity so that the frequency of intermittent rotation of the wheel 74 will rise and the pin 72 will shift closer to the shaft 23 so much as the temperature difference is large and the range of swing of the arm 76 will be large as well as the rotation stroke of the wheel 74 during its intermittent rotation, whereby the displayed figure on the counter 24 will rapidly increase.

If the difference of the temperature $T_1$ at the temperature detection part 13 and the temperature $T_2$ at the temperature detection part 15 becomes small the lever 22 will displace in the direction of the arrow D. And then the pin 72 travels farther from the rotary shaft 23 but approaching the axis of the shaft 66 so that the swing range of the arm 76 becomes small and the speed of integration for the display on the counter 24 becomes slower.

Thus, the rotation of shaft 19 is taken out from the shaft 23 at a speed controlled by the amount of displacement of the lever 22 in a mode of stepless speed changing whereby the counter 24 will indicate the consumed calories corresponding to the arithmetical result of calculation both for the flow quantity and the temperature difference.

In the above mentioned embodiment, the description was made specifically for application in the heating of the load 11, while the invention may also be applied with the same effect in the cooling of the load 11.

In the cooling case, normally the temperature of the cooled water passing through the pipeline 10 is approximately at 5° C. At the load 11, the water absorbs quantities of heat thereby causing the rise of temperature for example to about 15° C. for the water circulating to the pipeline 12.

During the operation, due to the higher temperature $T_2$ detected by the temperature detection part 15 relative to the temperature $T_1$ detected by the temperature detection part 13, the lever 22 is displaced farther in the direction of the arrow D than in the case when the temperatures $T_1$ and $T_2$ are equal to each other by the relative displacement of the members 31 and 32 of the temperature sensing operation parts 27 and 28.

By displacement of the lever 22 in the direction of arrow D, the lever 68 also displaces in the direction of arrow D and the pin 72 is shifted to the bottom of the groove 67 or to the open side at the forward end of the groove 77. Similar to the preceding embodiment, the leg 63b swings by rotation of the rotary shaft 19 and the arm 76 also swings, whereby the wheel 74 intermittently rotates consequently displaying the absorbed calories on the counter 24 through the rotary shaft 23.

When the calorie-measuring device of the invention is used both for heating and cooling, the stroke in the intermittent rotation of the arm 76 would be appreciably different depending on the cases in which the pin 72 may be shifted closer to the shaft 23 than to the axis of the shaft 66 or otherwise farther from the shaft 23. Should this difference not be neglected there may preferably be provided a mechanism for the correction of the difference on the rotary shaft 23 or a mechanism for the conversion of direction located in the middle of the lever 22, the latter mechanism serving for displacement of the arm invariably in one direction as, for instance, in the direction C in both cases of heating or cooling. It is therefore desirable to have the mechanism which will change the lever 22 by providing a characteristic reverse to the characteristic varying in the swing range of the arm 76 according to the displacement of the pin 72.

Figure 3:
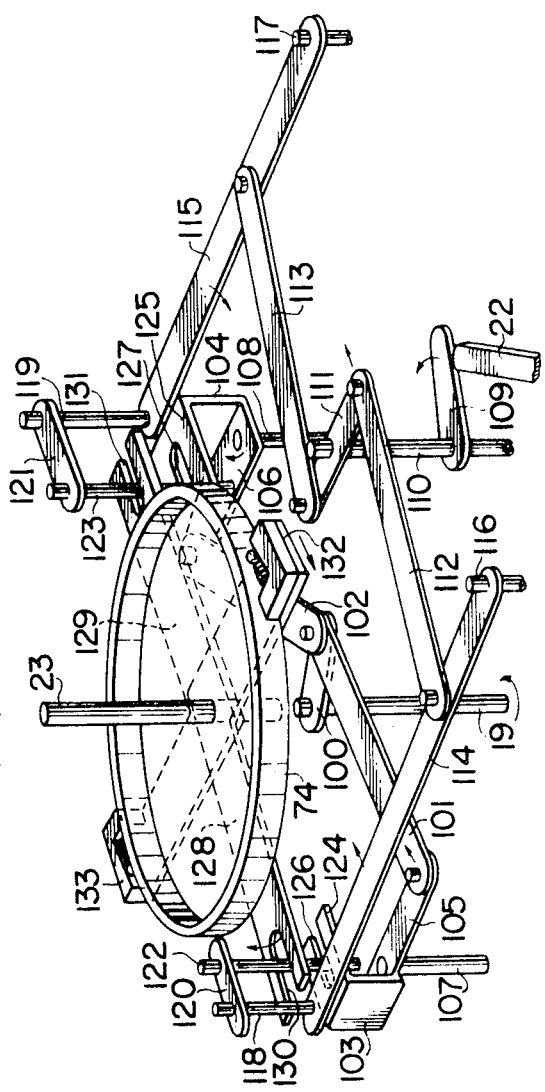
FIG. 3 is a perspective view of another embodiment of the control part.

FIG. 3 shows a perspective view of the second embodiment incorporating the control part 21. In the above embodiment as shown in FIG. 2 the wheel 74 repeats intermittent rotations which are shown on a time chart as a rotation cycle in the form, for instance, of the so-called half-wave rectification. In the embodiment of FIG. 3, however, the shown time chart may have a rotation cycle of full-wave rectification by the construction in which the wheel 74 is always rotated to secure more accurate and smoother indication of the measured calories.

With the rotation of the rotary shaft 19 from the flowmeter 17, an arm 100 rotates and crank arm 105 and 106 having forks 103 and 104 swing about shafts 107 and 108 through rods 101 and 102. Therefore, the displacement of the lever 22 is transmitted to levers 114 and 115 through a lever 109, a shaft 110, an arm 111, and rods 112 and 113. The levers 114 and 115 have respective ends rotatably provided on fixed shafts 116 and 117 and other ends provided with pins 122 and 123 through pins 118 and 119 and arms 120 and 121. The pins 122 and 123 are respectively provided with grooves 126 and 127 on legs 124 and 125 of the forks 103 and 104 as well as grooves 130 and 131 of swing arms 128 and 129 rotatably provided about the rotary shaft 23. The arms 128 and 129 are of L-shape and have at their ends respective unidirectional clutches 132 and 133 operative in the same direction and which contact the outer peripheral surface of the wheel 74.

When the rotary shaft 19 rotates in response to the flow quantity measured by the flowmeter 14, the arms 105 and 106 swing. Due to an input displacement of the lever 22 corresponding to the temperature difference detected by the temperature detection parts 13 and 15, the pins 122 and 123 move respectively in the grooves 126, 130 and 127, 131. By swinging of the legs 124 and 125 the arms 128 and 129 swing in opposite directions to each other. Accordingly, the clutches 132 and 133 rotate in opposite directions to each other whereby the wheel 74 engaged with one of the clutches frictionally makes continuous rotation. Thus, the rotary shaft 23 will make provide smooth and accurate indication of the calories on the counter 24 without intermittent rotation.

Figure 4:
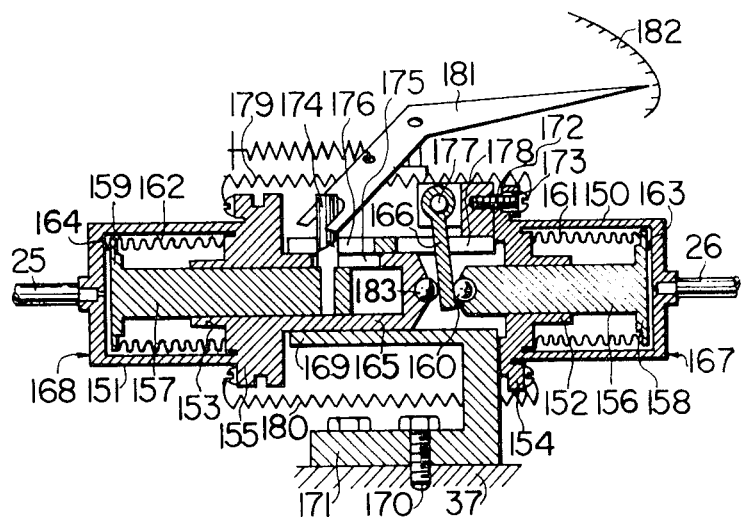
FIG. 4 is a vertical side elevation of another embodiment of the temperature difference-displacement conversion mechanism.
Figure 5:
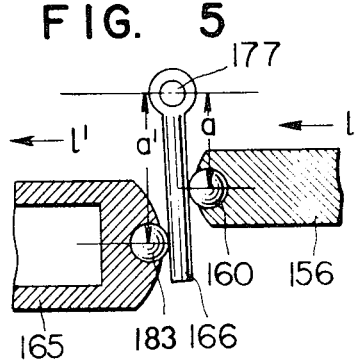
FIG. 5 is a partly enlarged view of the mechanism of FIG. 4.

FIG. 4 shows another embodiment of the temperature difference-displacement conversion mechanism. According to this embodiment, hollow operation cylinders 150 and 151 forming temperature sensing operation parts 167 and 168 have respectively at their one ends flanges 154 and 155 integral with guides 152 and 153 having passing holes. The holes slidably accommodate pushers 156 and 157 respectively as displacement members. At the ends of said pushers 156 and 157 are formed pistons 158 and 159. At the other end of the pusher 156 is provided a spherical contactor 160 for reducing the contact area. There are sealing bellows 161 and 162 provided in tension between the guides 152 and 153 and the pistons 158 and 159 and operation chambers 163 and 164 formed between the cylinders 150 and 151 and the pistons 158 and 159. Through the pipes 26 and 25, the operation chambers 163 and 164 are connected to the temperature detection parts 15 and 13 sealed with a liquid for operation. There may be used so-called O-rings or like sealing means in place of the bellows 161 and 162 for preventing leaking of liquid from chambers 163 and 164 into hollow parts of the cylinders 150 and 151.

Outwardly projecting from the flange 155 is a cylinder 165 formed integrally with this flange. In the hollow part of said cylinder 165 is slidably fitted the forward end of the pusher 157. A spherical contactor 183 is provided at the forward end of the 165 contacting a lever 166.

A cylindrical part 169 has a mounting seat 171 fastened to the frame 37 with bolts 170, with the flange 154 of the temperature sensing operation part 167 secured to one side thereof with bolts 172. The bolthole 173 of the flange 154 is cut in an elongated groove by which the axis of the pusher 156 can be offset relative to the axis of the cylinder 165. The cylinder 165 is inserted slidably into the cylinder part 169 so that the contactors 160 and 183 may normally be located on the same axis. Over the pusher 157 is provided a displacement output shaft 174 which outwardly projects through an elongated groove 175 formed on the cylinder 165 and an elongated groove 176 formed on the cylinder part 169. By displacement of the output shaft 174, a pointer 181 rotates indicating the temperature difference on a dial 182.

There is a lever 166 between the contactors 160 and 183, which is pivotally mounted on a shaft 177 at the upper end of the part 169 and which penetrates through an elongated groove 178 of the part 169. Between the flanges 154 and 155 are provided tension springs 179 and 180, by the resilient forces of which the contactors 160 and 183 are urged to always contact both sides of the lever 166.

The operation of the above-described construction is now described. It is assumed that before the operation there is minimum temperature difference between two temperature detection parts and the temperature sensing operation parts 167 and 168 are respectively in equilibrium.

When the temperature detection part connected to the temperature sensing operation part 167 rises in a predetermined temperature $\Delta t$, the sealed liquid in the temperature detection part will increase in volume and the thus increased volume will act in the operation chamber 163. The piston 158 may receive the described operation on its surface and the pusher 156 will be displaced to the left in the figure by the distance $\Delta 1$ after a travel in the guide 152. As the cylinder 165 is slidably inserted in the part 169, the cylinder 165 slides in the part 169 by the force of displacement of the pusher 156 through the lever 166 so that the temperature sensing operation part 168 including the cylinder 165 is displaced leftwardly by the distance $\Delta 1$.

Thereby the output shaft 174 shifts by the amount of displacement of the pusher 156 so that the pointer 181 indicates the temperature difference between the two temperature detection parts. The displacement amount of the shaft 174 can be taken out by suitable means to be transmitted to said control part 21 as an arithmetic factor of temperature difference.

Assuming that the temperature detection part connected to the temperature sensing operation part 168 solely rises in a predetermined temperature $\Delta t$, whereupon the operation chamber 164 is influenced by expansion of volume, then the piston 159 may receive the operation and the pusher 157 guided by the guide 153 is displaced by the distance $\Delta 1$ in the cylinder 165 rightwardly in the figure. By displacement of the pusher 157 there is taken out an amount of displacement from the shaft 174 corresponding to the temperature difference similar to the circumstance as described.

Even though the temperatures at both detection parts respectively connected to the temperature sensing operation parts 167 and 168 may simultaneously change, the pushers 156 and 157 and the cylinder 165 will act by combination of the described operations to obtain the amount of relative displacement corresponding to the temperature difference from the shaft 174.

Adjusting of the difference in construction by which the characteristics of the temperature sensing operation parts 167 and 168 are affected by differences of manufacturing, designing and other conditions will now be described. Before the adjusting operation, the axis of the pusher 156 and that of the cylinder 165 should be on the same line. The position of the operation cylinder 150 fixed in the elongated groove 173 with screw 172 is adjusted so that, for example, the axis of the pusher 156 will be offset upwardly from the axis of the cylinder 165. With the distance between the shaft 177 and the axis of the pusher 156 being $a$ and the distance between the shaft 177 and the axis of the cylinder 165 being $a'$, and assuming that the displacement of a distance $1'$ is produced in the cylinder 165 by displacement of a distance $1$ produced in the pusher 156, there is obtained the formula: $1'=a'/a1$. From this formula the distance $a$ may be regulated so that the amount of displacement 1 and 1' may be equal. Preferred selection of the distance $a$ may be made by adjustment of position of attachment of the cylinder 150 with the bolt 172.

While the invention has been described with respect to specific and preferable embodiments, various modifications and variations thereof will be apparent to those skilled in the art without departing from the scope of the invention as set forth in the appended claims.

What we claim is:

1. A calorie-measuring device comprising a piping for conveying a heat carrier through a load wherein the heat carrier radiates heat during a heating operation and absorbs heat during a cooling operation, a flowmeter in said piping for measuring the flow quantity of the heat carrier passing through said piping, two temperature detecting parts respectively mounted in said piping before and after said load in the flow direction of the heat carrier, a temperature difference-displacement converting means operatively coupled respectively with said two temperature detecting parts for displacement of a lever in an amount corresponding to the difference of temperatures detected by said temperature detecting parts and in a direction of displacement corresponding to the relation of the magnitude of temperatures, a first motion converting means for converting magnitude of rotation from said flowmeter to a swing motion, a first swing arm movable by said first motion converting means, a rotary body rotatable unidirectionally and providing rotation as a measured heat quantity, a second swing arm transmitting a swing motion of said first swing arm as a swing movement to intermittently rotate said rotary body unidirectionally, a pin engaging said first and second swing arms and transmitting the swing motion of said first swing arm to said second swing arm, and a displacing means for displacing said pin by said lever in one direction or the other corresponding to cooling or heating operations, about the axis of the swing motion of said first swing arm, wherein said pin does not transmit the swing motion of said first swing arm to said second swing arm when said pin is on the axis of swing motion of said first swing arm, while said pin transmits the swing motion of said first swing arm to said second swing arm when it is displaced from the axis of the swing motion of said first swing arm.

2. A calorie-measuring device as claimed in claim 1, wherein said first and second swing arms each have at respective ones of the ends thereof a groove receiving said pin, said first and second swing arms being disposed with openings of said grooves directed in opposite directions and separately in the direction of height, said pin being fitted through the grooves of said first and second swing arms perpendicularly to said two arms.

3. A calorie-measuring device as claimed in claim 1 wherein said first swing arm has a groove at the swinging end thereof, said second swing arm having a groove at one end and a unidirectional clutch at the other end, said pin penetrating through the grooves of said first and second swing arms and connecting the movements of said both arms, said output rotary shaft having an outer periphery in contact with said unidirectional clutch, and a wheel fixed to rotate with said shaft, said wheel being rotated only at the time of swinging rotation in the direction of said unidirectional clutch with said second swing arm.

4. A calorie-measuring device as claimed in claim 3 wherein said second swing arm comprises a plurality of swing arms with unidirectional clutches respectively in contact to said wheel, said each arm being so constructed as to successively rotate said wheel only at the time of alternate unidirectional swing rotation.

* * * * *